(12) United States Patent
Hotchkiss et al.

(10) Patent No.: US 11,855,859 B1
(45) Date of Patent: Dec. 26, 2023

(54) COMPUTERIZED SYSTEMS AND METHODS FOR APPLICATION PRIORITIZATION DURING RUNTIME

(71) Applicant: PLUME DESIGN, INC., Palo Alto, CA (US)

(72) Inventors: Adam Hotchkiss, Dallas, TX (US); Malay Vadher, Danville, CA (US); Krishna Kolakaluri, Fremont, CA (US); Divy Le Ray, San Jose, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 0 days.

(21) Appl. No.: 18/348,744

(22) Filed: Jul. 7, 2023

(51) Int. Cl.
*H04L 41/5022* (2022.01)
*H04L 41/0896* (2022.01)

(52) U.S. Cl.
CPC ...... *H04L 41/5022* (2013.01); *H04L 41/0896* (2013.01)

(58) Field of Classification Search
CPC .............. H04L 41/5022; H04L 41/0896
USPC ........................................... 709/223
See application file for complete search history.

(56) References Cited

U.S. PATENT DOCUMENTS

| | | | | |
|---|---|---|---|---|
| 9,426,029 | B2 * | 8/2016 | Saavedra | H04L 43/08 |
| 10,051,494 | B2 * | 8/2018 | Rengarajan | H04W 28/02 |
| 10,122,829 | B2 * | 11/2018 | Saavedra | H04L 12/2863 |
| 10,470,082 | B2 * | 11/2019 | Rengarajan | H04L 41/12 |
| 10,554,733 | B2 * | 2/2020 | Edara | H04W 36/22 |
| 10,708,126 | B2 * | 7/2020 | Singla | H04W 12/06 |
| 11,129,043 | B2 * | 9/2021 | Rengaraju | H04B 17/336 |
| 11,750,464 | B2 * | 9/2023 | Gali | H04L 41/40 709/223 |
| 2011/0202593 | A1 * | 8/2011 | Vaderna | H04W 8/22 709/224 |
| 2014/0328190 | A1 * | 11/2014 | Lord | H04W 24/08 370/252 |
| 2015/0341797 | A1 * | 11/2015 | Madan | H04W 24/02 370/329 |
| 2016/0043962 | A1 * | 2/2016 | Kim | H04W 4/80 709/224 |
| 2016/0254968 | A1 * | 9/2016 | Ebtekar | H04L 41/12 709/223 |

(Continued)

*Primary Examiner* — Tauqir Hussain
(74) *Attorney, Agent, or Firm* — Nicholas Martin; Greenberg Traurig, LLP

(57) ABSTRACT

Disclosed are systems and methods that provide a computerized application management framework that adaptively configures application usage and/or network parameters/characteristics at a location based on determined intelligence about the network, devices executing therein/therearound and behavioral patterns of users in/around the location. The disclosed framework can leverage information related to network capacity and coverage against network activity (e.g., upload/download, streaming, and the like) of devices connected to the network to determine i) which applications are to be prioritized, and/or ii) which devices operating such applications should be prioritized. Thus, the framework provides mechanisms for dynamically managing operations of devices connected to a network and applications executing on such devices that rely on such network connection, such that their network usage can be adaptively controlled to ensure network stability and integrity for prioritized operations.

17 Claims, 7 Drawing Sheets

(56) References Cited

U.S. PATENT DOCUMENTS

| | | | | |
|---|---|---|---|---|
| 2017/0139713 | A1* | 5/2017 | Gschwind | G06F 9/30112 |
| 2018/0091413 | A1* | 3/2018 | Richards | H04L 43/14 |
| 2018/0270126 | A1* | 9/2018 | Tapia | H04L 43/065 |
| 2018/0324607 | A1* | 11/2018 | Rengarajan | H04W 24/02 |
| 2019/0342795 | A1* | 11/2019 | McFarland | H04W 28/18 |
| 2020/0160176 | A1* | 5/2020 | Mehrasa | G06N 3/047 |
| 2021/0057097 | A1* | 2/2021 | Unuvar | G16H 30/40 |
| 2022/0277018 | A1* | 9/2022 | Umay | G06F 9/547 |
| 2023/0334206 | A1* | 10/2023 | Muthiah | G06F 30/327 |

* cited by examiner

COMPUTERIZED SYSTEMS AND METHODS FOR APPLICATION PRIORITIZATION DURING RUNTIME

FIELD OF THE DISCLOSURE

The present disclosure is generally related to application management, and more particularly, to a decision intelligence (DI)-based computerized framework for deterministically managing, controlling and prioritizing applications executing on a device(s), on a network and/or at a location.

BACKGROUND

Conventional mechanisms, protocols and implementations of modern application management are focused on which applications are critical to the operation of the device in which they are operating. For example, modules and/or other registry level operations may take precedence over applications focused on entertainment. However, such prioritization techniques are "inner-focused," in that they are at the device-level.

SUMMARY OF THE DISCLOSURE

Moreover, conventional device-level application optimization does not take into account other devices which may either be connected and/or operating on the same environment. In other words, which applications on connected Internet-of-Things (IoT) devices and/or other devices connected to the same network are currently executing.

Thus, according to some embodiments, the disclosed systems and methods provide a novel computerized application management framework that adaptively configures application usage and/or network parameters/characteristics at a location based on determined intelligence about the network, devices executing therein/therearound and behavioral patterns of users in/around the location. According to some embodiments, as discussed herein, the disclosed framework can leverage information related to network capacity and coverage against network activity (e.g., upload/download, streaming, and the like) of devices connected to the network to determine i) which applications are to be prioritized, and/or ii) which devices operating such applications should be prioritized.

By way of a non-limiting example, two users, user Jane and user Bob, are in their home, and both of their smart phones are connected to the network (e.g., Wi-Fi network, for example). As discussed herein, Jane's device is executing the application Instagram® and Bob's device is executing Zoom™. Since the date and time correspond to working hours (e.g., Monday at 11 AM), it can be determined that Bob's application of Zoom should be given precedence and/or the required bandwidth on the network so as to ensure his work Zoom meeting does not get interrupted. Thus, available bandwidth for Jane's Instagram session can proceed; however, her network activity can be limited to a throttled range of bandwidth so as not to impede the Zoom session. For example, Bob's Zoom session can be prevented from suffering from unnecessary pixelation from a reduction of available network bandwidth since his Zoom session can be essentially guaranteed the required allotment of bandwidth for the entirety of the session.

In another example, if Jane is also using Zoom, since it is known that Jane is Bob's daughter and she does not need Zoom for school, and it is determined that the day is a school holiday, Bob's Zoom session can still be prioritized since its determined importance can be prioritized over Jane's Zoom session with her friends (e.g., decision intelligence based on an understanding that "work" activities take precedence over "social" activities, for example). Accordingly, as discussed herein, context of usage, as well as actual usage can be leveraged to determine which applications have priority over others.

Thus, according to some embodiments, the disclosed framework provides mechanisms for dynamically managing operations of devices connected to a network and applications executing on such devices that rely on such network connection, such that their network usage can be adaptively controlled to ensure network stability and integrity for prioritized operations. Accordingly, as discussed herein, network configurations and/or network parameters can be managed, modified and manipulated to dynamically determined and evolving runtime environments so as to ensure the operational integrity of the applications/devices connected to and operating on the network.

According to some embodiments, a method is disclosed for a DI-based computerized framework for deterministically managing, controlling and prioritizing applications executing on a device(s), on a network and/or at a location. In accordance with some embodiments, the present disclosure provides a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device cause at least one processor to perform a method for deterministically managing, controlling and prioritizing applications executing on a device(s), on a network and/or at a location.

In accordance with one or more embodiments, a system is provided that includes one or more processors and/or computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DESCRIPTIONS OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

DETAILED DESCRIPTION

Figure 1:
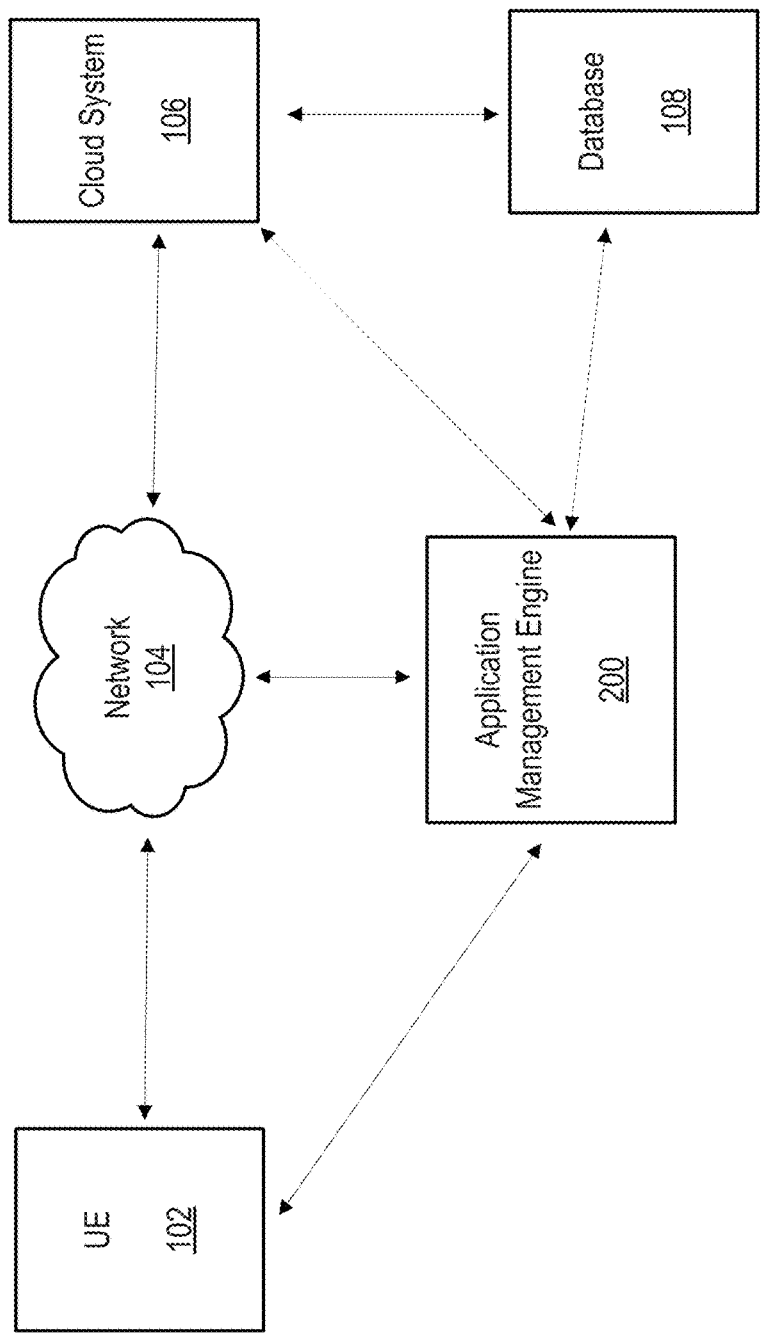
FIG. 1 is a block diagram of an example configuration within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ different architectures or may be compliant or compatible with different protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router mesh, or 2nd, $3^{rd}$, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or user, entity, subscriber or customer) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments and principles will be discussed in more detail with reference to the figures. With reference to FIG. 1, system 100 is depicted which includes user equipment (UE) 102 (e.g., a client device, as mentioned above and discussed below in relation to FIG. 7), network 104, cloud system 106, database 108 and application management engine 200. It should be understood that while system 100 is depicted as including such components, it should not be construed as limiting, as one of ordinary skill in the art would readily understand that varying numbers of UEs, access point devices, peripheral devices, cloud systems, databases and networks can be utilized; however, for purposes of explanation, system 100 is discussed in relation to the example depiction in FIG. 1.

According to some embodiments, UE 102 can be any type of device, such as, but not limited to, a mobile phone, tablet, laptop, sensor, IoT device, access point device (e.g., a router, switch, hub), autonomous machine, and any other device equipped with a cellular or wireless or wired transceiver.

In some embodiments, a peripheral device (not shown) can be connected to UE 102, and can be any type of peripheral device, such as, but not limited to, a wearable device (e.g., smart watch), printer, speaker, sensor, and the like. In some embodiments, a peripheral device can be any type of device that is connectable to UE 102 via any type of known or to be known pairing mechanism, including, but not limited to, WiFi, Bluetooth™, Bluetooth Low Energy (BLE), NFC, and the like.

In some embodiments, network 104 can be any type of network, such as, but not limited to, a wireless network, cellular network, the Internet, and the like (as discussed above). Network 104 facilitates connectivity of the components of system 100, as illustrated in FIG. 1.

According to some embodiments, cloud system 106 may be any type of cloud operating platform and/or network based system upon which applications, operations, and/or other forms of network resources may be located. For example, system 106 may be a service provider and/or network provider from where services and/or applications may be accessed, sourced or executed from. For example, system 106 can represent the cloud-based architecture associated with a smart home or network provider, which has associated network resources hosted on the internet or private network (e.g., network 104), which enables (via engine 200) the application management discussed herein.

In some embodiments, cloud system 106 may include a server(s) and/or a database of information which is accessible over network 104. In some embodiments, a database 108 of cloud system 106 may store a dataset of data and metadata associated with local and/or network information related to a user(s) of the components of system 100 and/or each of the components of system 100 (e.g., UE 102 and the services and applications provided by cloud system 106 and/or application management engine 200).

In some embodiments, for example, cloud system 106 can provide a private/proprietary management platform, whereby engine 200, discussed infra, corresponds to the novel functionality system 106 enables, hosts and provides to a network 104 and other devices/platforms operating thereon.

Figure 5:
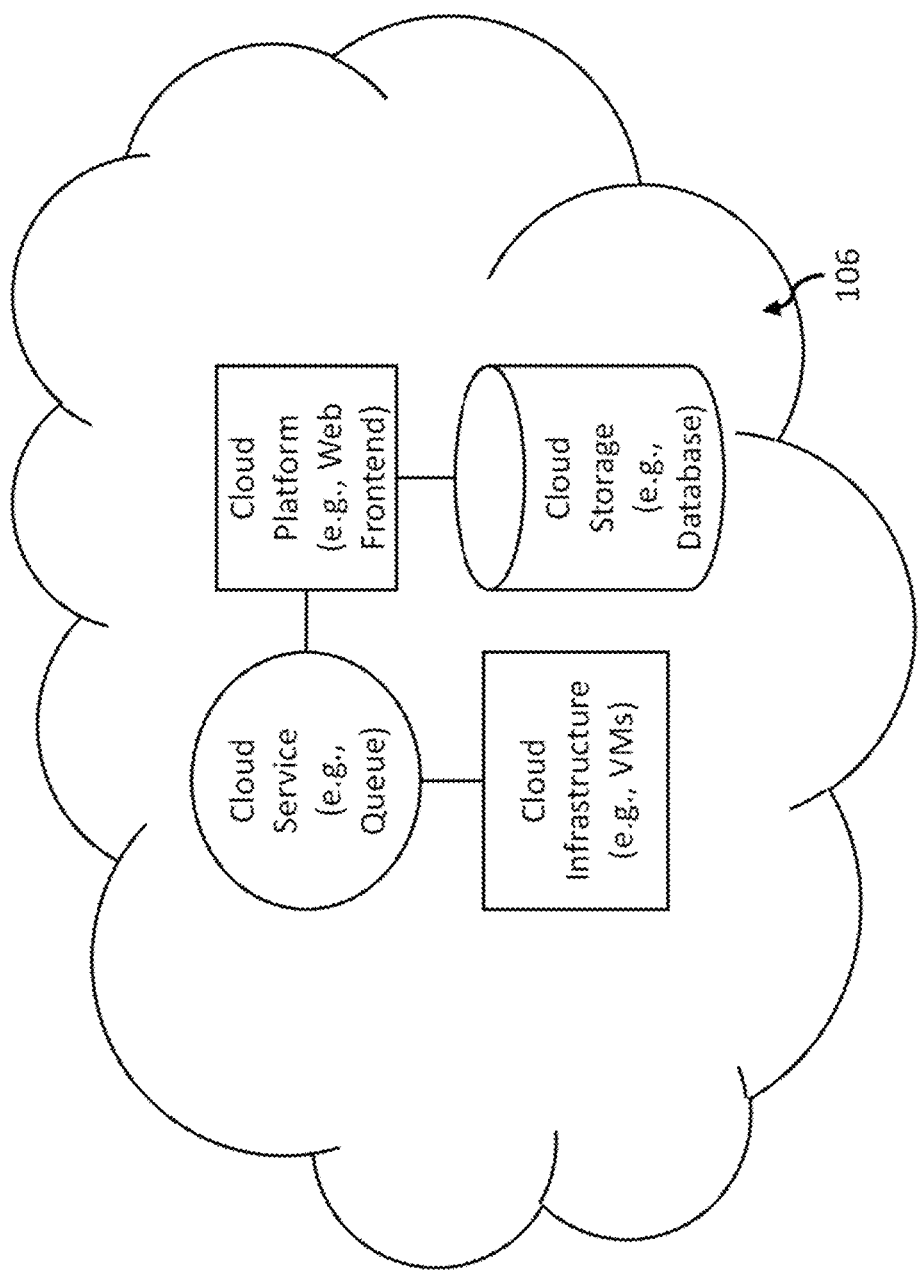
FIG. 5 depicts an exemplary implementation of an architecture according to some embodiments of the present disclosure.
Figure 6:
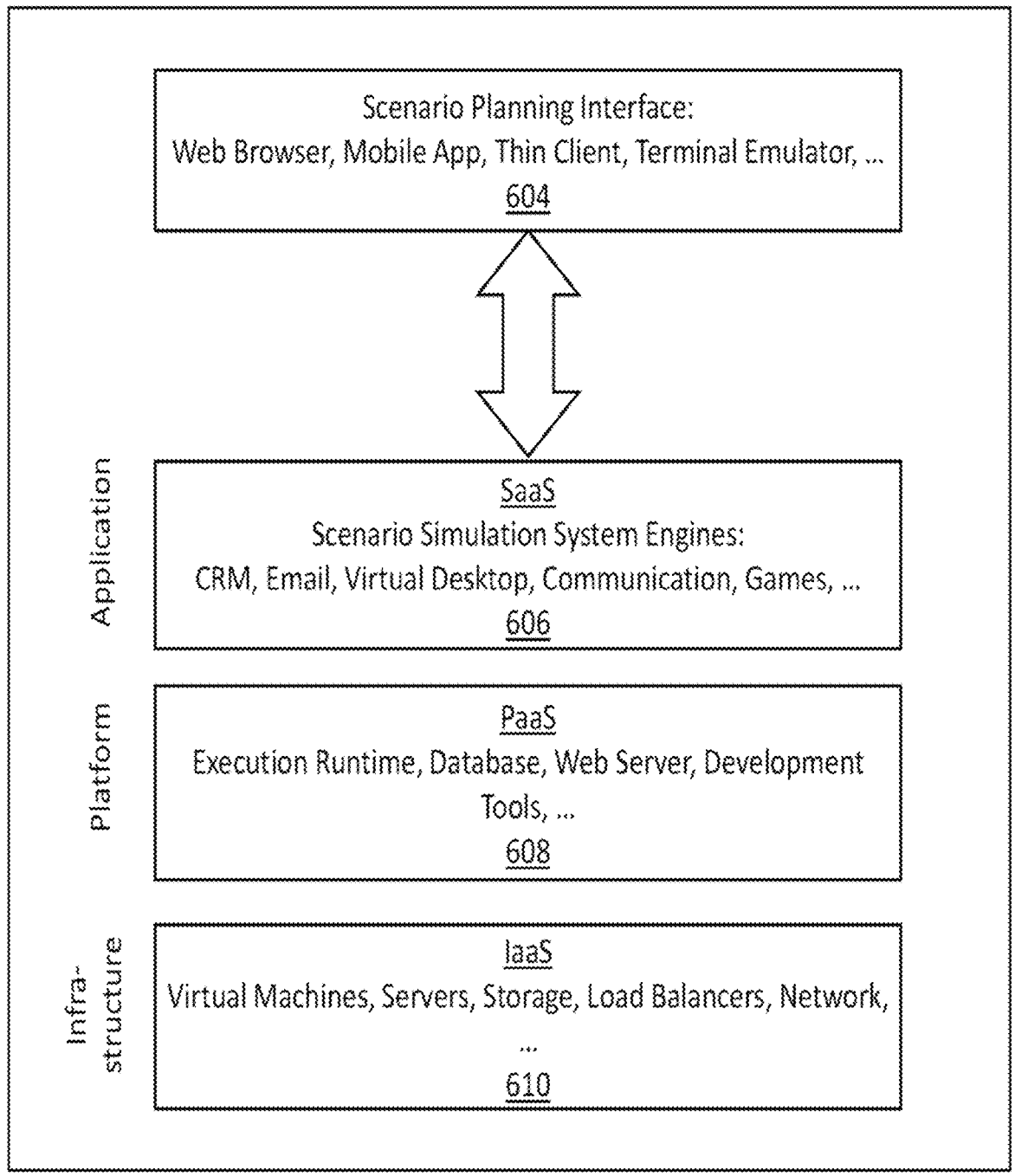
FIG. 6 depicts an exemplary implementation of an architecture according to some embodiments of the present disclosure.

Turning to FIGS. 5 and 6, in some embodiments, the exemplary computer-based systems/platforms, the exemplary computer-based devices, and/or the exemplary computer-based components of the present disclosure may be specifically configured to operate in a cloud computing/architecture 106 such as, but not limiting to: infrastructure as a service (IaaS) 610, platform as a service (PaaS) 608, and/or software as a service (SaaS) 606 using a web browser, mobile app, thin client, terminal emulator or other endpoint 604. FIGS. 5 and 6 illustrate schematics of non-limiting implementations of the cloud computing/architecture(s) in which the exemplary computer-based systems for administrative customizations and control of network-hosted application program interfaces (APIs) of the present disclosure may be specifically configured to operate.

Turning back to FIG. 1, according to some embodiments, database 108 may correspond to a data storage for a platform (e.g., a network hosted platform, such as cloud system 106, as discussed supra) or a plurality of platforms. Database 108 may receive storage instructions/requests from, for example, engine 200 (and associated microservices), which may be in any type of known or to be known format, such as, for example, standard query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository Application management engine 200, as discussed above and further below in more detail, can include components for the disclosed functionality. According to some embodiments, application management engine 200 may be a special purpose machine or processor, and can be hosted by a device on network 104, within cloud system 106 and/or on UE 102. In some embodiments, engine 200 may be hosted by a server and/or set of servers associated with cloud system 106.

According to some embodiments, as discussed in more detail below, application management engine 200 may be configured to implement and/or control a plurality of services and/or microservices, where each of the plurality of services/microservices are configured to execute a plurality of workflows associated with performing the disclosed application management. Non-limiting embodiments of such workflows are provided below in relation to at least FIGS. 3-4.

According to some embodiments, as discussed above, application management engine 200 may function as an application provided by cloud system 106. In some embodiments, engine 200 may function as an application installed on a server(s), network location and/or other type of network resource associated with system 106. In some embodiments, engine 200 may function as an application installed and/or executing on UE 102. In some embodiments, such application may be a web-based application accessed by UE 102 over network 104 from cloud system 106. In some embodiments, engine 200 may be configured and/or installed as an augmenting script, program or application (e.g., a plug-in or extension) to another application or program provided by cloud system 106 and/or executing on UE 102.

Figure 2:
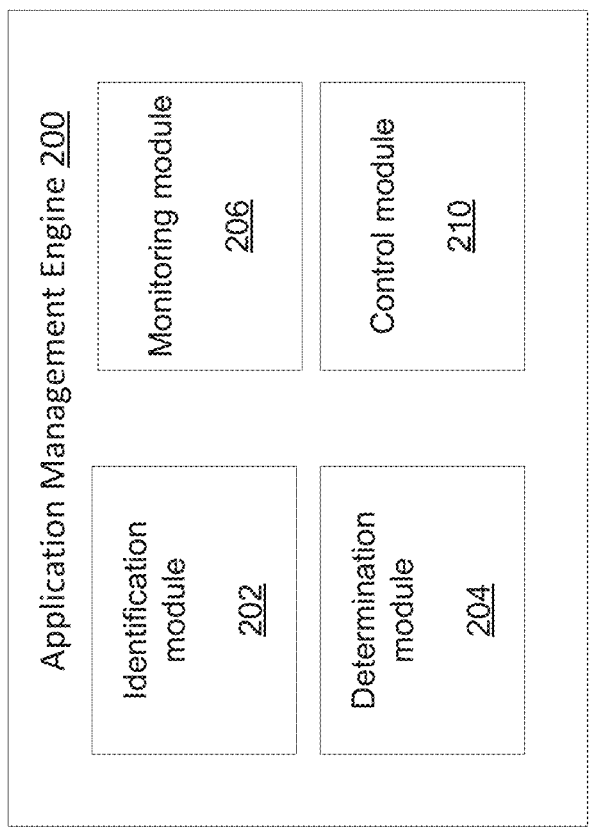
FIG. 2 is a block diagram illustrating components of an exemplary system according to some embodiments of the present disclosure.

As illustrated in FIG. 2, according to some embodiments, application management engine 200 includes identification module 202, determination module 204, monitoring module 206 and control module 208. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below.

Figure 3:
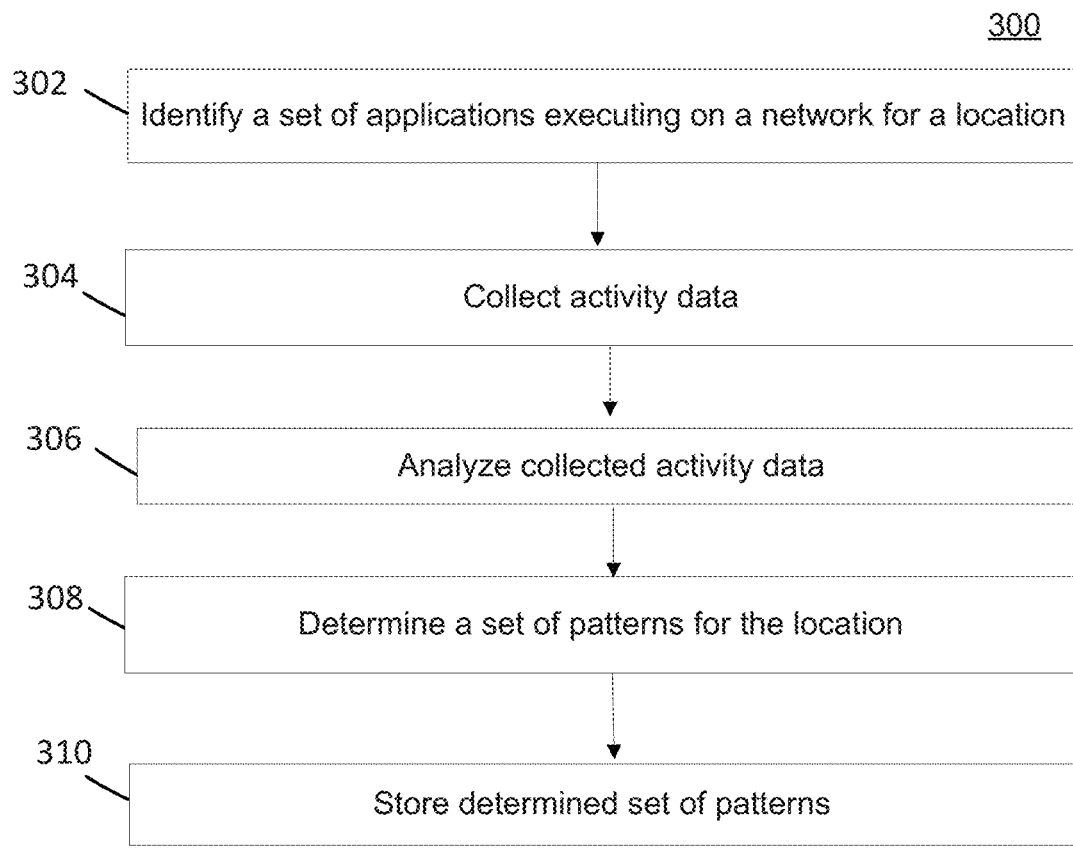
FIG. 3 illustrates an exemplary workflow according to some embodiments of the present disclosure.

Turning to FIG. 3, Process 300 provides non-limiting example embodiments for the disclosed application management framework. According to some embodiments, Process 300 provides the executable steps for collecting data about the network's operational environment, which as discussed below in relation to Process 400 of FIG. 4, enables the adaptive management of the network and its associated application/device management/control.

According to some embodiments, Steps 302-304 of Process 300 can be performed by identification module 202 of application management engine 200; and Steps 306-310 can be performed by determination module 204.

According to some embodiments, Process 300 begins with Step 302 where engine 200 can identify a set of devices for a location. The set of devices are devices that are connected to a network associated with the location, and/or connect to the network at least a threshold amount of times per a threshold amount of time (e.g., connects to the network at least 25 times per month, thereby indicating they live at the location).

According to some embodiments, a location can correspond to, but is not limited to, a home, office, building, and/or any other type of physical location that can be configured to host and/or provide network connectivity to devices in/around the geographic area. Accordingly, in some embodiments, the network, as discussed above, can be any type of communication network (e.g., a location-based or associated network such as Wi-Fi network, for example) that can enable devices to automatically connect upon being within range of the location and/or access point devices providing the network at/around the location.

According to some embodiments, Step 302 further involves, upon identification of the set of devices, an identification of the applications that are executing on the network from each device. According to some embodiments, identification of an application may be based on a criteria, such that, but not limited to, a certain amount of network traffic may be required to be associated with the application per a threshold time period for the application to be specifically identified. For example, if a user only uses an application once every month, and the application is simply to check stock prices, this minimal data usage may not be adequate to consider as part of the "regular" operations on the network. However, if a user, via their smart TV, streams movies at least 5 days a week, this would be considered a substantial amount of activity, therefore the applications executing on the TV to enable the streaming (e.g., Netflix®, Hulu®, for example) can be identified.

In some embodiments, Step 302 can further involve the identification of information, which can include, but is not limited to, a type of application, identity of application, version of application, subscription level associated with application, account(s) associated with application, device hosting the application, frequency of usage of application, MAC address or IP address of the device, the like, or some combination thereof.

In Step 304, engine 200 can operate to trigger the collection of network data (or activity data, used interchangeably) for each device and/or application for a predetermined period of time(s). For example, the collection can be in accordance with intervals (e.g., 8 hour spans of 24 hours so as to establish a usage schedule according to times of the day, for example), and/or can be based on detection of connectivity and usage over the network.

According to some embodiments, such network/activity data can be collected continuously and/or according to a predetermined period of time or interval. In some embodiments, the data may be collected based on detected events. In some embodiments, type and/or quantity of data may be directly tied to the type of application/device. For example, an application may only generate data for collection upon it being opened on a device and/or engaging in or causing network traffic. In another non-limiting example, a device may generate data for collection upon its initiation and connection to the network (e.g., upon a user getting home from work, their smart phone automatically connects to the Wi-Fi network upon the network becoming within range of the smart phone coming into physical range).

According to some embodiments, the collected data can include information related to, but not limited to, network usage (e.g., downloads, uploads, network resources accessed (e.g., web pages) and the like, which can be specific to a location, UE (user device, access point, for example), application and/or user, or some combination thereof), types of applications, types of devices, user identity, and the like, or some combination thereof.

In some embodiments, the collected data in Step 304 can be stored in database 108 in association with an identifier (ID) of a user, application, device, location and/or an associated account of any of the preceding user, application, device and/or location.

In Step 306, engine 200 can analyze the collected network/activity data. According to some embodiments, engine 200 can implement any type of known or to be known computational analysis technique, algorithm, mechanism or technology to analyze the collected data from Step 304.

In some embodiments, engine 200 may include a specific trained artificial intelligence/machine learning model (AI/ML), a particular machine learning model architecture, a particular machine learning model type (e.g., convolutional neural network (CNN), recurrent neural network (RNN), autoencoder, support vector machine (SVM), and the like), or any other suitable definition of a machine learning model or any suitable combination thereof.

In some embodiments, engine 200 may be configured to utilize one or more AI/ML techniques chosen from, but not limited to, computer vision, feature vector analysis, decision trees, boosting, support-vector machines, neural networks, nearest neighbor algorithms, Naive Bayes, bagging, random forests, logistic regression, and the like. By way of a non-limiting example, engine 200 can implement an XGBoost algorithm for regression and/or classification to analyze the collected data, as discussed herein.

According to some embodiments, the AI/ML computational analysis algorithms implemented can be applied and/or executed in a time-based manner, in that collected data for specific time periods can be allocated to such time periods so as to determine patterns of activity (or non-activity) according to a criteria. For example, engine 200 can execute a Bayesian determination for a 24 hour span every 8 hours, so as to segment the day according to applicable patterns, which can be leveraged to determine, derive, extract or otherwise activities/non-activities on the network according to devices/application in/around a location on the location's network.

In some embodiments and, optionally, in combination of any embodiment described above or below, a neural network technique may be one of, without limitation, feedforward neural network, radial basis function network, recurrent neural network, convolutional network (e.g., U-net) or other suitable network. In some embodiments and, optionally, in combination of any embodiment described above or below, an implementation of Neural Network may be executed as follows:

a. define Neural Network architecture/model,
b. transfer the input data to the neural network model,
c. train the model incrementally,
d. determine the accuracy for a specific number of timesteps,
e. apply the trained model to process the newly-received input data,
f. optionally and in parallel, continue to train the trained model with a predetermined periodicity.

In some embodiments and, optionally, in combination of any embodiment described above or below, the trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the aggregation function may be a mathematical function that combines (e.g., sum, product, and the like) input signals to the node. In some embodiments and, optionally, in combination of any embodiment described above or below, an output of the aggregation function may be used as input to the activation function. In some embodiments and, optionally, in combination of any embodiment described above or below, the bias may be a constant value or function that may be used by the aggregation function and/or the activation function to make the node more or less likely to be activated.

In Step 308, based on the analysis from Step 306, engine 200 can determine a set of patterns for applications (or devices) operating on the network at the location. In some embodiments, the patterns can be specific to a user or users, to an application or application, to a device or devices, and/or some combination thereof. For example, the patterns can indicate that user A typically streams movies on his phone each weeknight from 8 pm to 10 pm in her bedroom; and user B video chats with her friends from 5 pm to 6 pm on the weekend days. In another non-limiting example, a pattern can indicate that the smart speaker in the kitchen typically streams a podcast each weekday morning that is not a holiday. According to some embodiments, the determined patterns are based on the computational AI/ML analysis performed via engine 200, as discussed above.

Accordingly, in some embodiments, the set of patterns can correspond to, but are not limited to, types of events, types of detected activity, a time of day, a date, type of user, type of application, type of device, duration, amount of activity, quantity of activities, sublocations within the location (e.g., rooms in the house, for example), and the like, or some combination thereof.

In Step 310, engine 200 can store the determined set of patterns in database 108, in a similar manner as discussed above. According to some embodiments, Step 310 can involve creating a data structure associated with each determined pattern, whereby each data structure can be stored in a proper storage location associated with an identifier of the user, application, device and/or location, as discussed above.

In some embodiments, a pattern can comprise a set of events, which can correspond to an activity and/or non-activity (e.g., downloading music content, sending work emails, and the like, for example). In some embodiments, the pattern's data structure can be configured with header (or metadata) that identifies a user, device, application or the location, and/or a time period/interval of analysis (as discussed above); and the remaining portion of the structure providing the data of the activity/non-activity. In some embodiments, the data structure for a pattern can be relational, in that the events of a pattern can be sequentially ordered, and/or weighted so that the order corresponds to events with more or less activity.

In some embodiments, the structure of the data structure for a pattern can enable a more computationally efficient (e.g., faster) search of the pattern to determine if later detected events correspond to the events of the pattern, as discussed below in relation to Process 400 of FIG. 4. In some embodiments, the data structures of patterns can be, but are not limited to, files, arrays, lists, binary, heaps, hashes, tables, trees, and the like, and/or any other type of known or to be known tangible, storable digital asset, item and/or object.

According to some embodiments, the collected data can be identified and analyzed in a raw format, whereby upon a determination of the pattern, the data can be compiled into refined data (e.g., a format capable of being stored in and read from database 108). Thus, in some embodiments, Step 310 can involve the creation and/or modification (e.g., transformation) of the collected data into a storable format.

In some embodiments, as discussed below, each pattern (and corresponding data structure) can be modified based on further detected behavior, as discussed below in relation to Process 400 of FIG. 4.

Figure 4:
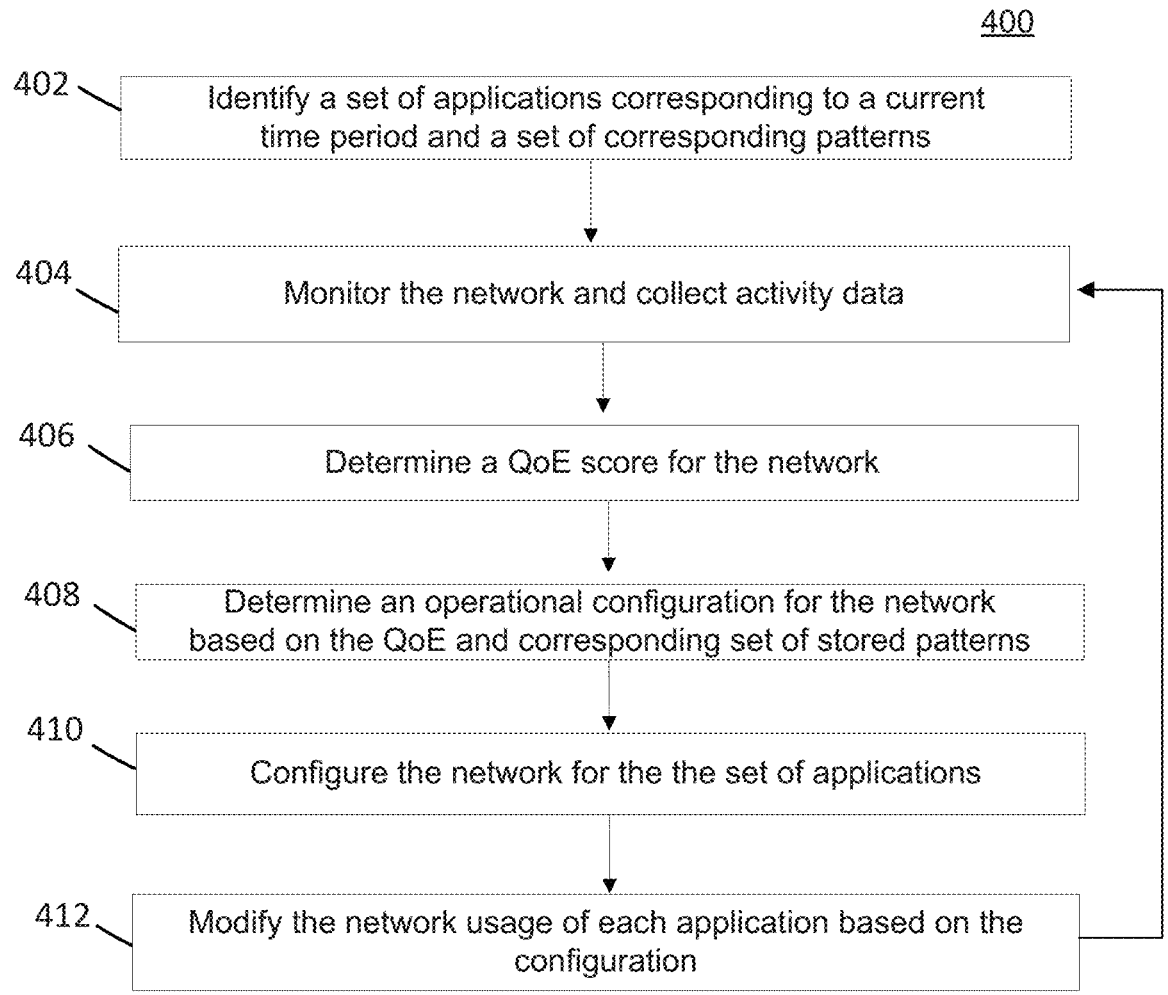
FIG. 4 illustrates an exemplary workflow according to some embodiments of the present disclosure.

Turning to FIG. 4, Process 400 provides non-limiting example embodiments for the deployment and/or implementation of the disclosed application management framework for a network at a location.

According to some embodiments, as discussed herein, the disclosed framework, via engine 200, provides a "usage-aware" adaptive network (e.g., WiFi) that can prioritize application operations of devices connected to the network to ensure that high-priority operations can be performed without degradation of the network from non-preferred or non-prioritized operations/applications. As discussed herein, the disclosed framework can effectuate a "traffic on demand" (ToD) implementation for a network such that predicated and/or observed behaviors by applications/devices on the network can trigger traffic allocations to be adaptively configured and/or modified to meet the required needs of such behaviors.

According to some embodiments, Step 402 can be performed by identification module 202 of application management engine 200; Step 404 can be performed by monitoring module 206; Steps 406-408 can be performed by determination module 204; and Steps 410-412 can be performed by control module 208.

According to some embodiments, Process 400 begins with Step 402 where engine 200 can identify a set of applications corresponding to a current time or time period. For example, Step 402 can involve the identification of applications that are currently operating on a network (e.g., conducting network traffic with data levels being at least a threshold amount).

According to some embodiments, while the discussion herein will focus on application management on a network, it should not be construed as limiting, as one of skill in the art would recognize that the disclosed systems and methods discussed herein are applicable to prioritizing user activity and/or device activity on the network in a similar manner without departing from the scope of the instant disclosure.

Accordingly, in some embodiments, Step 402 can further involve identification of a set of patterns for such applications. In some embodiments, as discussed above, the set of patterns can correspond to a pattern(s) of activity stored in Step 310, discussed supra. In some embodiments, the detection of the pattern(s) can be based on, but not limited to, a time, date, activity at the location, type and/or quantity of network traffic/data, number of connected devices, settings of an access point device, settings of the service provider, user input, and the like, or some combination thereof.

For example, Step 402 can be based on a time being detected, whereby a set of patterns determined for a set of users at the location can be retrieved from storage. For example, at 6 pm on a Monday, engine 200 can retrieve the patterns for the residents of a home so that the associated and proper mode of the location's network can be properly provisioned, as discussed herein.

In Step 404, engine 200 can perform operations of monitoring the network, which can be based on a set of patterns identified in Step 402. In some embodiments, such monitoring can be effectuated via the engine 200 operating on UE 102 and/or any other device of system 100, as discussed above in relation to FIG. 1. For example, engine 200 can collect activity data for an application on a device of a user at the location from their smartphone (e.g., UE 102).

In some embodiments, engine 200 can monitor the location continuously, and/or according to a predetermined time interval. In some embodiments, the monitoring can involve push and/or fetch protocols to collect activity data from each connected device.

In Step 406, based on the monitoring and collection of activity data in Step 404, engine 200 can determine a current Quality of Experience (QoE) score for the network at the location. As discussed herein, the QoE can provide an indication as to the operational configurations of the network respective to particular applications, devices and/or users, and can be utilized so as to enable modifications to the network parameters, firmware, software and/or hardware at the location, which can cause scaling of the network's capabilities and/or implementation.

According to some embodiments, engine 200 can compile the collected data from Step 404, and the information from the identified set of patterns from Step 402, and determine the QoE so as to determine the required/needed usage by an application(s) of the network (e.g., current demands on the network). According to some embodiments, engine 200 can analyze the data and the pattern information via any type of AI/ML model, which can be performed in a similar manner as discussed above at least in relation to Step 306 of Process 300.

In Step 408, engine 200 can determine an operational configuration of the network. According to some embodiments, the determined operational configuration can enable state and/or mode transitions, and/or traffic/bandwidth allocations on/within the network. In some embodiments, the operational configuration can be determined via analysis of the QoE and associated data of the applications operating on the network via the AI/ML models, as discussed above.

Thus, according to some embodiments, Step 408 can determine which types of network parameters are required for the applications and/or their associated types. For example, applications with large demands on download speeds may have a high QoE, whereas applications that have small digital footprints on network (e.g., an SMS application, for example, WhatsApp®) may have a low QoE. In some embodiments, types of applications may be weighted based on their determined type. For example, FaceTime® on the iPhone® may have a high QoE given its reliance on large amounts of network data; however, Microsoft Teams® may have similarly valued QoE score that is weighted so that it is ranked higher than FaceTime; this may be due to Teams being used for work purposes, and it is not customary for FaceTime to be a work engagement, as it is more utilized for social activities. It should be understood, however, that such considerations can be derived and/or subsequently applied based on the determined set of patterns from Process 300, discussed supra.

Accordingly, in some embodiments, Step 408 can result in a ranking and/or ranked listing, embodied as an executable data structure, that can indicate a priority of the set of applications identified in Step 402. This, as discussed below, can be utilized by engine 200 to customize the network so that the higher priority applications can operate with their network reliance being impeded from lower priority applications.

Continuing with Process 400, in Step 410, engine 200 can configure the network parameters, firmware, software and/or hardware components of an access point device and/or the network parameters of the network as a whole based on the determined operational configuration(s). As discussed herein, such configurations can correspond to management, control and/or changes to which channels, interfaces and/or antennas are available, as well as how frequent such channels, interface and/or antennas communicate and/or process network based information. Indeed, the operational configuration in Step 408 can be applied to a network such that a specific application can be directed to specific channels on the network so that their network traffic is guaranteed a certain amount (e.g., a minimum and/or range) of available bandwidth and/or threshold amount of network speeds.

And, based on the configurations of Step 410, engine 200 can perform and/or effectuate Step 412 where the network can be provided (e.g., provisioned, enacted, initiated, modified, updated and/or made accessible, for example) according to the modified capabilities (e.g., customized network capacity and coverage, as discussed herein).

As depicted in FIG. 4, Process 400 can recursively proceed from Step 412 to Step 404, where the network traffic and/or characteristics can be monitored so as to ensure the proper network configuration is currently being activated and implemented for the location and/or the applications operating therein. As such, the disclosed framework, via engine 200 can optimize a location's network with enough margin to accommodate/meet the QoE (usage) of the devices connected to and/or relying on the network.

According to some embodiments, a network can have a dedicated engine 200 model so that the application management protocols applied to the network can be specific to the events and patterns learned and detected on that network. In some embodiments, the model can be specific for a device or set of devices and/or user or set of users (e.g., users that live at a certain location (e.g., a house), and/or are within a proximity to each other (e.g., work on the same floor of an office building, for example)).

Figure 7:
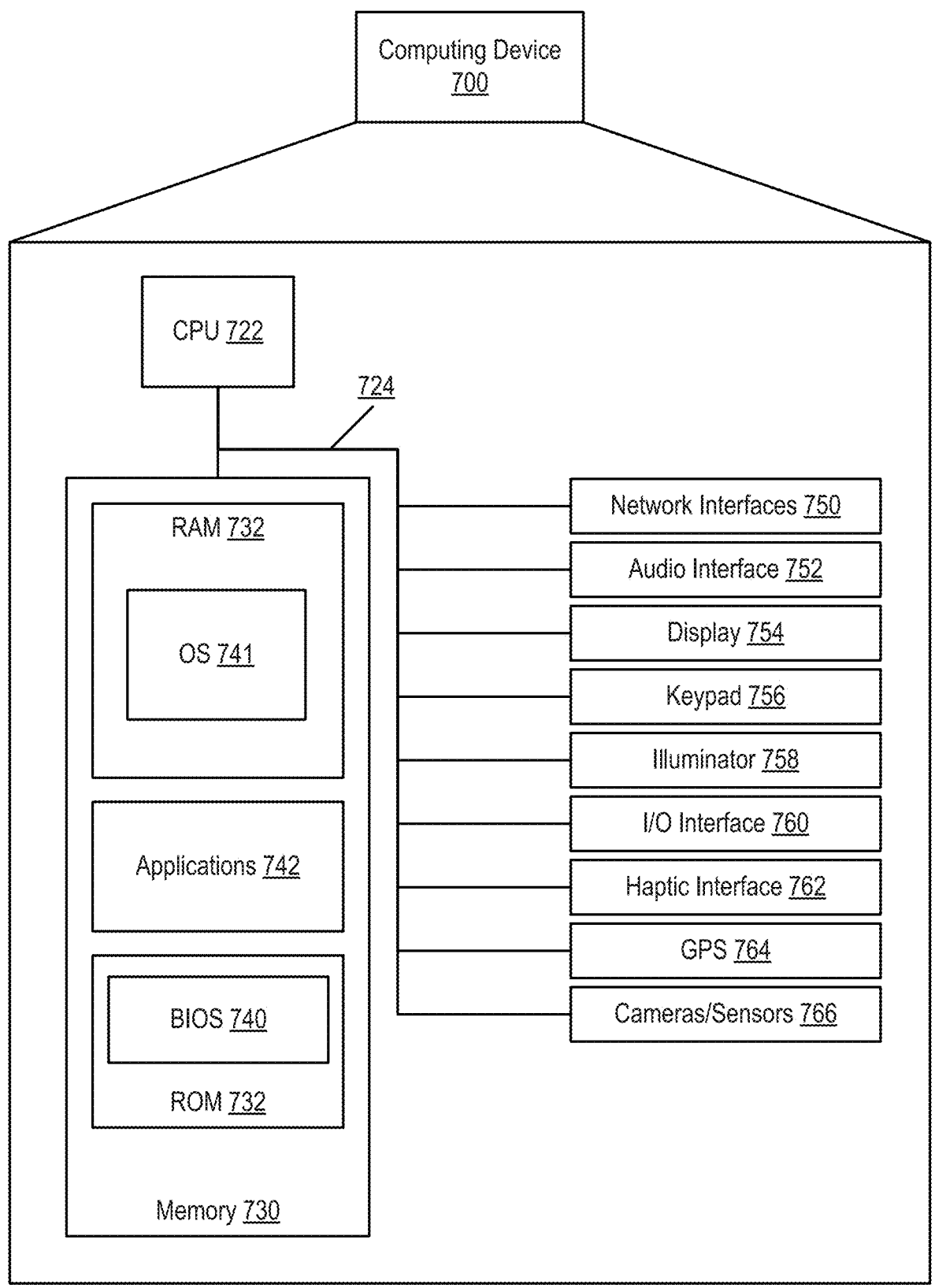
FIG. 7 is a block diagram illustrating a computing device showing an example of a client or server device used in various embodiments of the present disclosure.

FIG. 7 is a schematic diagram illustrating a client device showing an example embodiment of a client device that may be used within the present disclosure. Client device 700 may include many more or less components than those shown in FIG. 7. However, the components shown are sufficient to disclose an illustrative embodiment for implementing the present disclosure. Client device 700 may represent, for example, UE 102 discussed above at least in relation to FIG. 1.

As shown in the figure, in some embodiments, Client device 700 includes a processing unit (CPU) 722 in communication with a mass memory 730 via a bus 724. Client device 700 also includes a power supply 726, one or more network interfaces 750, an audio interface 752, a display 754, a keypad 756, an illuminator 758, an input/output interface 760, a haptic interface 762, an optional global positioning systems (GPS) receiver 764 and a camera(s) or other optical, thermal or electromagnetic sensors 766. Device 700 can include one camera/sensor 766, or a plurality of cameras/sensors 766, as understood by those of skill in the art. Power supply 726 provides power to Client device 700.

Client device 700 may optionally communicate with a base station (not shown), or directly with another computing device. In some embodiments, network interface 750 is sometimes known as a transceiver, transceiving device, or network interface card (NIC).

Audio interface 752 is arranged to produce and receive audio signals such as the sound of a human voice in some embodiments. Display 754 may be a liquid crystal display (LCD), gas plasma, light emitting diode (LED), or any other type of display used with a computing device. Display 754 may also include a touch sensitive screen arranged to receive input from an object such as a stylus or a digit from a human hand.

Keypad 756 may include any input device arranged to receive input from a user. Illuminator 758 may provide a status indication and/or provide light.

Client device 700 also includes input/output interface 760 for communicating with external. Input/output interface 760 can utilize one or more communication technologies, such as USB, infrared, Bluetooth™, or the like in some embodiments. Haptic interface 762 is arranged to provide tactile feedback to a user of the client device.

Optional GPS transceiver 764 can determine the physical coordinates of Client device 700 on the surface of the Earth, which typically outputs a location as latitude and longitude values. GPS transceiver 764 can also employ other geo-positioning mechanisms, including, but not limited to, tri-angulation, assisted GPS (AGPS), E-OTD, CI, SAI, ETA, BSS or the like, to further determine the physical location of client device 700 on the surface of the Earth. In one embodiment, however, Client device may through other components, provide other information that may be employed to determine a physical location of the device, including for example, a MAC address, Internet Protocol (IP) address, or the like.

Mass memory 730 includes a RAM 732, a ROM 734, and other storage means. Mass memory 730 illustrates another example of computer storage media for storage of information such as computer readable instructions, data structures, program modules or other data. Mass memory 730 stores a basic input/output system ("BIOS") 740 for controlling low-level operation of Client device 700. The mass memory also stores an operating system 741 for controlling the operation of Client device 700.

Memory 730 further includes one or more data stores, which can be utilized by Client device 700 to store, among other things, applications 742 and/or other information or data. For example, data stores may be employed to store information that describes various capabilities of Client device 700. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 700.

Applications 742 may include computer executable instructions which, when executed by Client device 700, transmit, receive, and/or otherwise process audio, video, images, and enable telecommunication with a server and/or another user of another client device. Applications 742 may further include a client that is configured to send, to receive, and/or to otherwise process gaming, goods/services and/or other forms of data, messages and content hosted and provided by the platform associated with engine 200 and its affiliates.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, API, instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data. Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   identifying, by a device, a set of applications, the set of applications executing at a time on a network, each of the applications having a corresponding set of patterns related to known network usage;
   collecting, by the device, current network activity data for each of the set of applications;
   analyzing, by the device, for each application, the current network activity data based on a respective set of patterns;
   determining, by the device, based on the analysis of the current network activity, a Quality of Experience (QoE) value for each application, the QoE value comprising information indicating a required usage of the network by a respective application;

determining, by the device, a ranking for the set of applications based on the QoE value for each application in the set of applications, the ranking corresponding to a priority of execution on the network;

automatically, by the device, configuring network parameters of the network based on the determined ranking, the automatic configuration comprising modifications to the network parameters so as to prioritize network usage of a higher ranking application over a lower ranking application; and enabling, by the device, the set of applications to operate at the time via the configured network parameters of the network.

2. The method of claim 1, wherein the configuration further comprises:

allocating specific portions of the network to specific applications based on the ranking, wherein the portion of the network corresponds to at least one of a channel and an antenna of an access point device at a location.

3. The method of claim 2, wherein the specific applications are assigned a minimum portion of bandwidth for a time period based on an associated ranking to each specific application.

4. The method of claim 1, further comprising:

analyzing information related to each of the set of applications; and determining, based on the information analysis, a type of each application.

5. The method of claim 4, wherein the ranking of the set of applications is further based on the determined type of each application, wherein a respective application is weighted based on its respective type.

6. The method of claim 1, further comprising:

collecting activity data from a plurality of applications operating on the network;

analyzing the activity data;

determining a plurality of patterns of behavior for the network; and storing the determined plurality of patterns of behavior, wherein the set of patterns are identified from the stored plurality of patterns of behavior.

7. The method of claim 1, wherein the network is a location-specific network, wherein the network is a Wi-Fi network.

8. The method of claim 1, wherein the device is a user device.

9. The method of claim 1, wherein the device is an access point for a location.

10. A device comprising:

a processor configured to:

identify a set of applications, the set of applications executing at a time on a network, each of the applications having a corresponding set of patterns related to known network usage;

collect current network activity data for each of the set of applications;

analyze, for each application, the current network activity data based on a respective set of patterns;

determine, based on the analysis of the current network activity, a Quality of Experience (QoE) value for each application, the QoE value comprising information indicating a required usage of the network by a respective application determine a ranking for the set of applications based on the QoE value for each application in the set of applications, the ranking corresponding to a priority of execution on the network;

automatically configure network parameters of the network based on the determined ranking, the automatic configuration comprising modifications to the network parameters so as to prioritize network usage of a higher ranking application over a lower ranking application; and enable the set of applications to operate at the time via the configured network parameters of the network.

11. The device of claim 10, wherein the processor is further configured to:

allocate specific portions of the network to specific applications based on the ranking, wherein the portion of the network corresponds to at least one of a channel and an antenna of an access point device at a location.

12. The device of claim 11, wherein the specific applications are assigned a minimum portion of bandwidth for a time period based on an associated ranking to each specific application.

13. The device of claim 10, wherein the processor is further configured to:

analyze information related to each of the set of applications; and determine, based on the information analysis, a type of each application, wherein the ranking of the set of applications is further based on the determined type of each application, wherein a respective application is weighted based on its respective type.

14. A non-transitory computer-readable storage medium tangibly encoded with computer-executable instructions that when executed by the device, perform a method comprising:

identifying, by the device, a set of applications, the set of applications executing at a time on a network, each of the applications having a corresponding set of patterns related to known network usage;

collecting, by the device, current network activity data for each of the set of applications;

analyzing, by the device, for each application, the current network activity data based on a respective set of patterns;

determining, by the device, based on the analysis of the current network activity, a Quality of Experience (QoE) value for each application, the QoE value comprising information indicating a required usage of the network by a respective application;

determining, by the device, a ranking for the set of applications based on the QoE value for each application in the set of applications, the ranking corresponding to a priority of execution on the network;

automatically, by the device, configuring network parameters of the network based on the determined ranking, the automatic configuration comprising modifications to the network parameters so as to prioritize network usage of a higher ranking application over a lower ranking application; and enabling, by the device, the set of applications to operate at the time via the configured network parameters of the network.

15. The non-transitory computer-readable storage medium of claim 14, wherein the configuration further comprises:

allocating specific portions of the network to specific applications based on the ranking, wherein the portion of the network corresponds to at least one of a channel and an antenna of an access point device at the location.

16. The non-transitory computer-readable storage medium of claim 15, wherein the specific applications are assigned a minimum portion of bandwidth for a time period based on an associated ranking to each specific application.

17. The non-transitory computer-readable storage medium of claim 14, further comprising:
   analyzing information related to each of the set of applications; and
   determining, based on the information analysis, a type of each application, wherein the ranking of the set of applications is further based on the determined type of each application, wherein a respective application is weighted based on its respective type.

* * * * *